(12) United States Patent
Rehan et al.

(10) Patent No.: US 9,860,294 B2
(45) Date of Patent: Jan. 2, 2018

(54) MEDIA CONTENT STREAMING

(71) Applicant: INTEL CORPORATION, Santa Clara, CA (US)

(72) Inventors: Mohamed M. Rehan, Cairo (EG); Hassnaa Moustafa, Portland, OR (US); Yomna Hassan, Cairo (EG); Mohamed Badawi, Cairo (EG); Yiting Liao, Hillsboro, OR (US); Jeffrey R. Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,361

(22) Filed: Dec. 24, 2014

(65) Prior Publication Data
US 2016/0192296 A1 Jun. 30, 2016

(51) Int. Cl.
*H04L 29/06* (2006.01)
*G06F 1/32* (2006.01)
(Continued)

(52) U.S. Cl.
CPC .............. *H04L 65/604* (2013.01); *G06F 1/32* (2013.01); *H04L 65/601* (2013.01);
(Continued)

(58) Field of Classification Search
CPC ... H04L 65/604; H04L 65/4069; H04L 69/22; H04L 65/80; H04W 52/02;
(Continued)

(56) References Cited

U.S. PATENT DOCUMENTS 9,432,433 B2 * 8/2016 Luby ................ H04N 21/23106
2007/0285311 A1 * 12/2007 Abraham .............. G01S 5/0036
342/357.62

(Continued)

FOREIGN PATENT DOCUMENTS

WO WO 2014/063726 A1 5/2014
WO WO 2014/138331 A2 9/2014

OTHER PUBLICATIONS

3GPP TS 26.114, "IP Multimedia Telephony; Media handling and interaction", Jun. 2011, 240 pages, Version 11.0.0, Release 11.
(Continued)

*Primary Examiner* — Magdi Elhag
(74) *Attorney, Agent, or Firm* — Thorpe North & Western

(57) ABSTRACT

Technology for receiving streaming media content is disclosed. A media presentation description (MPD) for the streaming media content can be received at a user equipment (UE). A streaming interval can be selected for the streaming media content. A power consumption level can be calculated for receiving the streaming media content at each of a plurality of media content representations that are described in the MPD. A media content representation can be selected from the plurality of media content representations based on: the power consumption level associated with receiving the streamed media content at the media content representation; and power status information for the UE, using the one or more processors of the UE. The streaming media content can be received at the selected media content representation, at the UE, in accordance with the streaming interval. The streaming media content can be played at the UE.

23 Claims, 11 Drawing Sheets

(51) Int. Cl.
H04N 21/2343 (2011.01)
H04N 21/262 (2011.01)
H04N 21/442 (2011.01)
H04N 21/443 (2011.01)
H04N 21/45 (2011.01)
H04N 21/6373 (2011.01)
H04N 21/845 (2011.01)
H04W 52/02 (2009.01)

(52) U.S. Cl.
CPC . *H04N 21/23439* (2013.01); *H04N 21/26258* (2013.01); *H04N 21/4424* (2013.01); *H04N 21/4436* (2013.01); *H04N 21/44209* (2013.01); *H04N 21/4516* (2013.01); *H04N 21/6373* (2013.01); *H04N 21/8456* (2013.01); *H04W 52/0229* (2013.01); *H04W 52/0254* (2013.01); *H04W 52/0274* (2013.01); *H04W 52/0277* (2013.01); *Y02B 60/50* (2013.01)

(58) Field of Classification Search
CPC ......... H04W 52/0209; H04W 52/0225; H04W 52/0229; H04W 52/0251
USPC .......................................... 455/574; 370/311
See application file for complete search history.

(56) References Cited

U.S. PATENT DOCUMENTS

| | | | | |
|---|---|---|---|---|
| 2009/0180549 | A1* | 7/2009 | Hosein | H04L 1/0014 375/240.25 |
| 2013/0007223 | A1* | 1/2013 | Luby | H04N 21/23106 709/219 |
| 2013/0094364 | A1* | 4/2013 | Bjorkengren | H04W 52/0232 370/236 |
| 2013/0166580 | A1* | 6/2013 | Maharajh | H04L 65/605 707/758 |
| 2014/0019634 | A1* | 1/2014 | Srinivasan | H04L 65/80 709/231 |
| 2014/0019635 | A1* | 1/2014 | Reznik | H04L 65/607 709/231 |
| 2014/0136727 | A1* | 5/2014 | Lim | H04L 65/4084 709/231 |
| 2014/0258552 | A1* | 9/2014 | Oyman | H04N 19/146 709/231 |
| 2014/0317308 | A1* | 10/2014 | Zhang | H04L 65/4069 709/231 |
| 2014/0365556 | A1* | 12/2014 | Rehan | H04L 65/60 709/203 |
| 2014/0380379 | A1* | 12/2014 | Klappert | H04N 21/4436 725/58 |
| 2015/0026358 | A1* | 1/2015 | Zhang | H04L 65/601 709/231 |
| 2015/0100701 | A1* | 4/2015 | Mao | H04L 65/60 709/231 |
| 2015/0200986 | A1* | 7/2015 | Stockhammer | H04L 65/4069 709/219 |
| 2015/0271179 | A1* | 9/2015 | Wang | H04L 63/10 726/30 |
| 2016/0050246 | A1 | 2/2016 | Liao et al. | |
| 2016/0080833 | A1* | 3/2016 | Denoual | H04N 21/234327 725/116 |

OTHER PUBLICATIONS

3GPP TS 26.140, "Multimedia Messaging Service (MMS); Media formats and codecs", Mar. 2012, 13 pages, Version 11.0.0 Release 11.
3GPP TS 26.234, "Transparent end-to-end Packet-switched Streaming Service (PSS); Protocols and codecs", Mar. 2012, 169 pages, Version 11.0.0, Release 11.
3GPP TS 26.244, "Transparent end-to-end packet switched streaming service (PSS); 3GPP file format (3GP)", Jun. 2012, 58 pages, Version 11.0.0, Release 11.
3GPP TS 26.247, "Transparent end-to-end Packet-switched Streaming Service (PSS); Progressive Download and Dynamic Adaptive Streaming over HTTP (3GP-DASH)", Sep. 2012, 112 pages, Version 11.0.0, Release 11.
3GPP TS 26.346, "Multimedia Broadcast/Multicast Service (MBMS); Protocols and codecs", Mar. 2012, 163 pages, Version 11.0.0, Release 11.
He et al, "Power Aware HEVC Streaming for Mobile", Visual Communications and Image Processing (VCIP), IEEE, Nov. 2013, pp. 1-5, XP032543720.

* cited by examiner

MEDIA CONTENT STREAMING

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
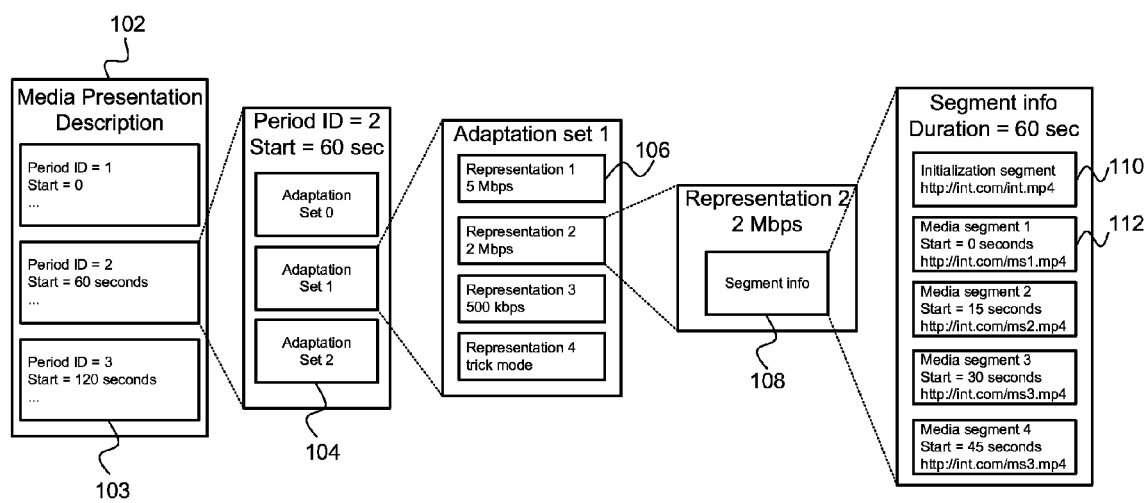
FIG. 1 illustrates a block diagram of a media presentation description (MPD) metadata file configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for receiving streaming media content at a user equipment (UE). The UE can receive a media presentation description (MPD) for the streaming media content. The MPD can describe a plurality of media content representations that are available to be received at the UE. For example, each media content representation can be associated with a corresponding bitrate and/or quality level. The UE can calculate a power consumption level for receiving the streaming media content at each of a plurality of media content representations. For example, the UE can calculate that streaming media content at a first media content representation (e.g., a first bitrate) consumes X amount of power per a unit of time, streaming media content at a second media content representation (e.g., a second bitrate) consumes Y amount of power per the unit of time, and so on. The UE can calculate the power consumption level for each media content representation using a model type associated with the UE and/or a display resolution of the UE. The UE can select at which media content representation to stream the media content based on a plurality of factors. For example, the UE can select the media content representation based on the power consumption level associated with receiving the streamed media content at the media content representation, power status information for the UE (e.g., a remaining battery level), user-defined power consumption preferences, and/or a remaining amount of time for the streaming media content. The UE can retrieve the streaming media content at the selected media content representation to enable playback at the UE.

In one configuration, the UE can select a burst size for receiving the streaming media content based on an available download rate at the UE. For example, the UE can select a 1-second burst of streaming media content, a 5-second burst of streaming media content, etc. The UE can fetch the bursts of streaming media content at the selected media content representation according to the selected burst size in order to optimize power consumption at the UE. For example, the UE can switch off a radio interface at the UE between bursts of streaming media content that are received at the UE. As a non-limiting example, the UE can receive a 5-second burst of streaming media content when network conditions are favorable (i.e., the network conditions allow for a relatively high download rate). The UE can then switch off the radio interface for a defined number of seconds (e.g., 4 seconds) before fetching the next burst of streaming media content in order to conserve power at the UE.

Hypertext transfer protocol (HTTP) adaptive streaming (HAS) can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

When using HAS to deliver internet multimedia content, a video client operating on a mobile device can be configured to perform the primary role in rate adaptation by choosing and requesting the appropriate video representation levels from a video server using an HTTP GET or partial GET command to retrieve data from a specified resource, such as a multimedia server. The video client initially builds up a buffer to a certain level before beginning to playback streaming multimedia content, such as audio or video. This phase is referred to as the startup phase. After this, the client begins playback of the buffered multimedia content. The quality and resolution of the multimedia playback at the client device is dependent on the available link bandwidth. The video client typically estimates the available link bandwidth based only on higher layer throughput estimates, such as HTTP-level video streaming throughput, or on transmission control protocol (TCP) throughput.

Multimedia streaming in a high mobility environment can be challenging when fluctuations in network conditions (i.e., network variability) decreases a communication data rate associated with the multimedia content. When an overloaded network causes the communication data rate to decrease, an end user quality of experience (QoE) can decrease as well. For example, the multimedia content received at the mobile device can be of less resolution or quality and/or the multimedia content can periodically break or pause when being provided over the overloaded network.

The use of progressive download based streaming techniques in mobile networks of limited resources can be undesirable due to inefficient bandwidth utilization and poor end user quality of experience. As discussed in further detail below, hyper-text transfer protocol (HTTP) based streaming services, such as dynamic adaptive streaming over HTTP (DASH), can be used to address weaknesses of progressive download based streaming.

Multimedia content that is streamed to a client, such as a user equipment (UE), can include a plurality of multimedia content segments. The multimedia content segments can each contain different encoded versions that represent different qualities levels of the multimedia content. The different encoded versions can allow the client to seamlessly adapt to changing network conditions. For example, when the network conditions are good (i.e., the network conditions are above a predetermined threshold), the client can request multimedia content segments that are of a higher video quality. When the network conditions are poor (i.e., the network conditions are below a predetermined threshold), the client can request multimedia content segments that are of a lower video quality. As a result, the client can still be able to receive the multimedia content segments (albeit at a lower quality) when the network conditions are poor and a likelihood of the adaptive media stream being interrupted can be reduced.

In DASH, the client can select the multimedia content segments with a highest bit rate, such that the multimedia content segments can be downloaded at the client in time for media playback without causing a rebuffering event in the media playback. In other words, the client may not select multimedia content segments that are so high that the adaptive media stream is periodically interrupted in order to cache or preload a portion of the media content onto the client before resuming media playback at the client. In one example, adverse network conditions can degrade a quality of the media content stream. The adverse network conditions can include coverage nulls, abrupt bandwidth changes, packet losses, substantial delay variations, etc. Although adaptive streaming techniques can consider current network conditions when calculating an available throughput and determining an appropriate streaming bit rate based on the available throughput, smooth media playback at the client may not be guaranteed during abrupt network variations and/or adverse network conditions.

Therefore, in order to maintain a desirable quality of experience for an adaptive media stream at the client, the client's planned route and current network conditions along the planned route can be used to strategically cache the multimedia content segments at the client, thereby resulting in smoother media playback and an enhanced quality of experience at the client. The client can select a planned route (i.e., a geographical route that the client is about to embark on). The client can be streaming media content (e.g., a movie) while traveling on the planned route. In one example, the client can include a mobile device located within a moving vehicle or a computing device of the vehicle. The client can receive current network conditions for the planned route from a channel information database (CID). The current network conditions can include certain locations along the planned route (e.g., tunnels, bridges, remote areas) with corresponding network conditions that are below a predetermined threshold. The client can request additional media content segments of the media content (e.g., additional segments of the movie) from a media content server and then store the additional media content segments in the cache. When the client reaches the locations along the planned route with network conditions that are below the predetermined threshold, the client can playback media content that is stored in the cache. As a result, continuous media playback can be substantially provided at the client, even during times when current network conditions along the planned route fall below the predetermined threshold.

Wireless Multimedia Standards

There have been a number of multimedia standards that have been developed to enable multimedia to be communicated to, from, or between mobile computing devices. For instance, in streaming video, the third generation partnership project (3GPP) has developed technical specification (TS)

26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GPP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). An MTSI-based transmitter UE terminal can capture and record video, and then transfer the video to an MTSI-based receiver UE terminal over a 3GPP network. The receiver UE terminal can then decode and render the video. The 3GPP TS 26.140 also enables video sharing using multimedia sharing services (MMS), in which support for the 3GP file format is provided.

The standards described above are provided as examples of wireless multimedia standards that can be used to communicate multimedia files to, from, and/or between multimedia devices. The examples are not intended to be limiting. Additional standards can be used to provide streaming video, conversational video, or video sharing.

Streaming Media Standards

A more detailed explanation of HTTP streaming, and more particularly, the DASH standard is provided herein, in context with embodiments of the present invention. The detailed explanation is not intended to be limiting. As will be further explained in the proceeding paragraphs, the embodiments of the present invention can be used to efficiently communicate multimedia to, from, and/or between mobile devices by enabling the mobile devices, or the servers in communication with the mobile devices, to select and/or communicate multimedia having a desired energy characterization. The multimedia can be communicated using a standardized or non-standardized communication scheme.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable simplified streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

DASH is a standardized HTTP streaming protocol. As illustrated in FIG. 1, DASH can specify different formats for a media presentation description (MPD) metadata file 102 that provides information on the structure and different versions of the media content representations stored in the server as well as the segment formats. The MPD metadata file contains information on the initialization and media segments for a media player (e.g., the media player can look at initialization segment to determine a container format and media timing information) to ensure mapping of segments into a media presentation timeline for switching and synchronous presentation with other representations. DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow for fast adaptation to changing network and wireless link conditions, user preferences and device capabilities, such as display resolution, the type of central processing unit (CPU) employed, the memory resources available, and so forth. The dynamic adaptation of DASH can provide a better quality of experience (QoE) for a user, with shorter startup delays and fewer rebuffering events than other streaming protocols.

Figure 2:
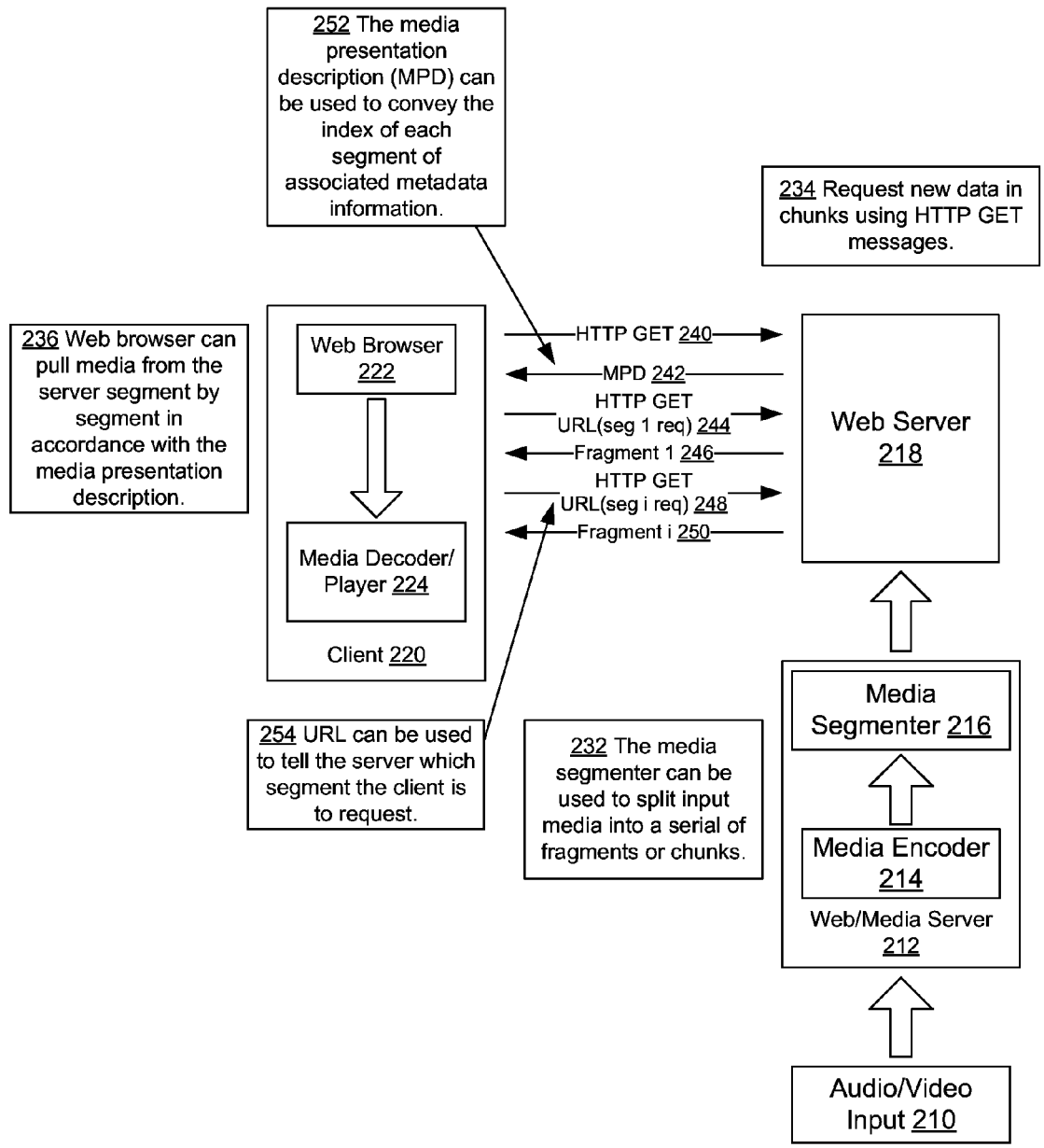
FIG. 2 illustrates a block diagram of hypertext transfer protocol (HTTP) streaming in accordance with an example.

In DASH, a media presentation description (MPD) metadata 102 can provide information on the structure and different versions of the media content representations stored in a web/media server 212, as illustrated in FIG. 2. In the example illustrated in FIG. 1, the MPD metadata is temporally divided into periods having a predetermined length, such as 60 seconds in this example. Each period can include a plurality of adaptation sets 104. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set can also include audio in different languages. The different alternatives offered in the adaptation set are referred to as representations 106.

In FIG. 1, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video can also be available in different formats, such as two dimensional (2D) or three dimensional (3D) video. Each representation 106 can include segment information 108. The segment information can include initialization information 110 and the actual media segment data 112. In this example, an MPEG 4 (MP4) file is streamed from a server to a mobile device. While MP4 is used in this example, a wide variety of different codecs can be used, as previously discussed.

The multimedia in the adaptation set can be further divided into smaller segments. In the example of FIG. 1, the 60 second video segment of adaptation set 1 is further divided into four sub-segments 112 of 15 seconds each. These examples are not intended to be limiting. The actual length of the adaptation set and each media segment or sub-segment is dependent on the type of media, system requirements, potential types of interference, and so forth. The actual media segments or sub-segments can have a length that is less than one second to several minutes long.

As shown in FIG. 2, the MPD metadata information can be communicated to a client 220, such as a mobile device. A mobile device can be a wireless device configured to receive and display streaming media. In one embodiment, the mobile device can only perform part of this function, such as receiving the streaming media and then communicating it to another device or a display device for rendering. The mobile device can be configured to run a client 220. The client can request the segments using an HTTP GET 240 message or a series of partial GET messages. The client can control the streaming session, such as managing an on-time request and smooth play-out of a sequence of segments, or potentially adjusting bitrates or other attributes, to react to changes of a wireless link, a device state or a user preference.

FIG. 2 illustrates a DASH-based streaming framework. A media encoder 214 in the web/media server 212 can encode an input media from an audio/video input 210 into a format for storage or streaming. A media segmenter 216 can be used to split the input media into a series of segments 232, which can be provided to a web server 218. The client 220 can request new data in segments using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server segment by segment in accordance with the MPD 242 as shown in 236. For instance, the web browser can request a first segment using a HTTP GET URL(frag 1 req) 244. A uniform resource locator (URL) or universal resource locator can be used to tell the web server which segments the client is to request 254. The web server can provide the first fragment (i.e., segment 1 246). For subsequent segments, the web browser can request a segment i using a HTTP GET URL(frag i req) 248, where i is an integer index of the segment. As a result, the web server can provide a segment i 250. The segments can be presented to the client via a media decoder/player 224.

Figure 3:
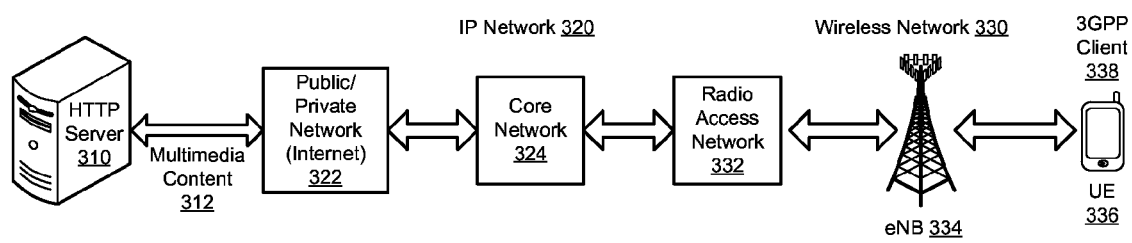
FIG. 3 illustrates a block diagram of an energy characterization-aware radio access network (RAN) architecture for hypertext transfer protocol-based (HTTP-based) video streaming in accordance with an example.

FIG. 3 illustrates a flow of multimedia content 312 between an HTTP server 310 providing the multimedia content to a 3GPP client 338 operating on a mobile device, such as a UE 336. The HTTP server can interface with a public or private network 322 (or the Internet) in communication with a core network 324 of a wireless wide area network (WWAN). In one embodiment, the WWAN can be a 3GPP LTE based network or an IEEE 802.16 based network (i.e. 802.16-2009). The core network can access a wireless network 330, such as an evolved packet system (EPS) via a radio access network (RAN) 332. The RAN 332 can provide the multimedia content to the client operating on the UE 336 via a node (e.g., an evolved Node B (eNB) 334).

In one example, the HTTP server 310 can be coupled to a channel information database 350. The channel information database 350 can include current network conditions for a plurality of geographical locations. The plurality of geographical locations can include particular roads, streets, neighborhoods, geographical regions, bridges, tunnels, etc. The current network conditions can be based on real-time monitoring of the current network conditions for the plurality of geographical locations. Therefore, the channel information database 350 can be dynamically updated due to variations in the current network conditions. Alternatively, the current network conditions can be inferred based on historical network condition information for the plurality of geographical locations. In yet another example, the current network conditions can be determined using crowd sourced network condition information.

The technology described herein provides a novel power-efficient media content (e.g., video and audio) streaming technique. The novel media content streaming technique can support the dynamic adaptive streaming over hypertext transfer protocol (DASH) protocol. The novel media content streaming technique described herein can improve difficulties with previous streaming solutions. For example, previous streaming technologies can fail to stream full movies to the UE due to battery limitations (e.g., the battery at the UE can die halfway through the movie or before the movie is completely received at the UE). Previous streaming technologies can fail to stream an entire movie at substantially the same quality level during low power conditions at the UE. Previous streaming technologies generally do not use contextual information, such as device type, device power consumption levels, etc. for various media content streaming modes at the UE. These streaming modes can include 3G, WiFi and other related streaming modes. In addition, previous streaming technologies generally provide inefficient evaluation and use of content quality when optimizing the download of media content at the UE. The novel media content streaming technique described herein can generally improve the above problems with past streaming solutions.

The technology described herein provides various advantages over prior streaming solutions, such as continuous streaming quality throughout an entire video, continuous monitoring and alignment with device conditions, an improved opportunity to avoid abrupt power failure due to inefficient use of power during media content streaming, and an improved use of other streaming context information for optimal device performance and a streaming experience. The present technology can be applicable to mobile media content streaming (e.g., both live and on-demand media content streaming) applications, as well as broadcasting applications, in which the streaming environment (e.g., the network) can have limited bandwidth and the wireless devices are battery operated. As described in further detail below, the present technology can detect an amount of energy left in the device and accordingly select a bit rate to receive the streaming media content, as well as determine a burst size for receiving the streaming media content in order to improve power efficiency at the device.

The technology described herein presents various improvements in battery-constrained UEs and bandwidth-limited scenarios involving the UEs. For example, the DASH protocol can be extended to include the UE's battery information, video consumption information, a user's data plan status, user power preferences related to power consumption at the UE, etc. These power-related factors can aid a DASH client in the UE in determining which media content segments to fetch from a media content server. As a result, media content delivery can be optimized for power efficiency, thereby providing an extended battery life.

The technology described herein can improve the DASH protocol by adding device aware capabilities (e.g., battery level, power consumption for each video bitrate), the user's power preferences, and other media content characteristics in terms of quality level and length. A end-user device can extract real-time information on the device's battery level, the user's power consumption preference, and the video content being received from a multimedia server. In one example, the device can capture the user's power consumption preferences, obtain information on the video content from a media presentation description (MPD) file, and detect the battery level based on information received from operating system (OS) drivers in the device. In another example, the number of media content representations (at various bitrates) for the streaming media content can be extended or increased at the multimedia server based on the UE status (in terms of battery, screen size or user's consumption preference for instance). In addition, additional context information can be added in the MPD file for each of the media content representations, such as a video length, a quality level, etc.

In previous versions of the DASH protocol, a DASH client in the UE can select which media content segments are to be provided to the DASH client for playback at the UE. The DASH client can select the media content segments from a list of possible media content representations that are stored at a DASH server. The DASH client can select the media content segments according to a bitrate. In other words, the DASH client can select the bitrate according to an available network throughput, and then fetch the media content segments that correspond to the selected bitrate. In previous versions of the DASH protocol, the DASH client can select the highest bitrate for the media content segments in accordance with the available network throughput, thereby providing the best possible quality with respect to current network conditions. However, in previous versions of the DASH protocol, the DASH client does not select the media content download based on content quality and power efficiency at the UE, as described with the present technology.

Figure 4:
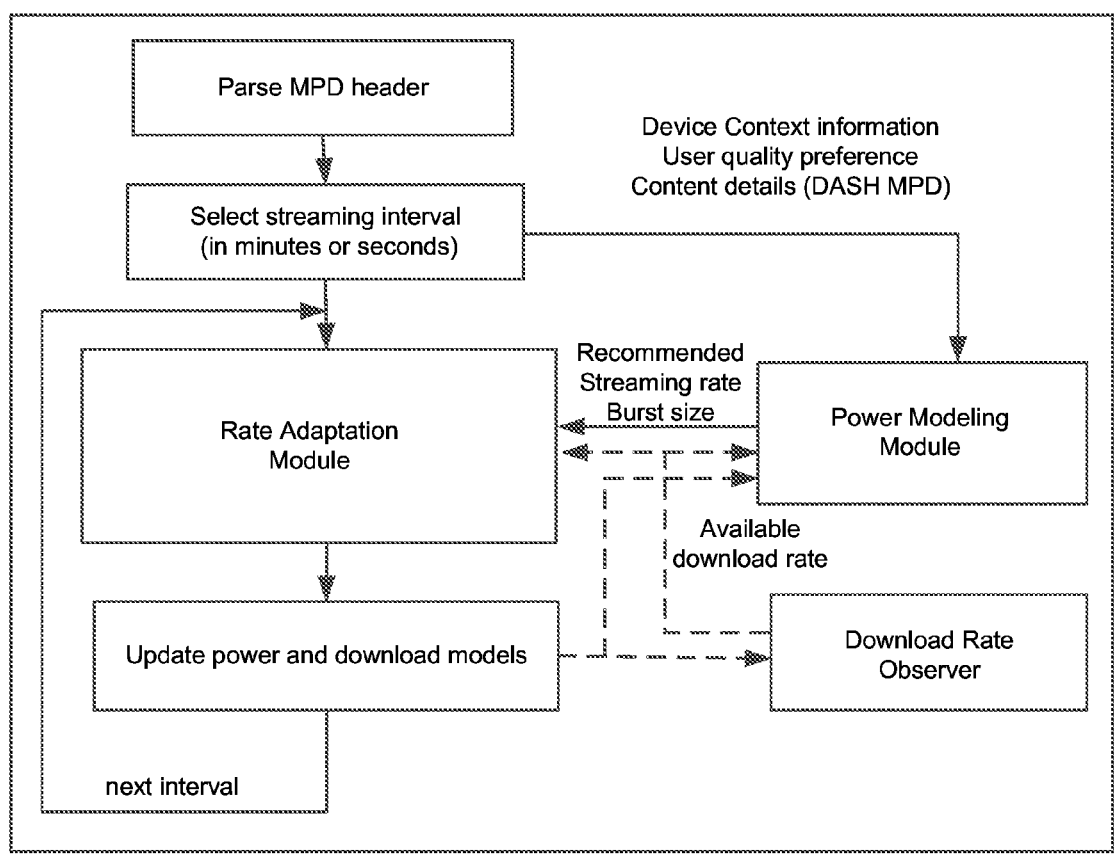
FIG. 4 is a flowchart that illustrates selecting media content segments to be received at a user equipment (UE) based on power-related contextual information in accordance with an example.

FIG. 4 is an exemplary flowchart that illustrates selecting media content segments to be received at a user equipment (UE) based on power-related contextual information. The UE can receive a media presentation description (MPD) file. The MPD file can describe media content segments at a plurality of representations (or bitrates). For example, the MPD file can describe a first set of media content segments at a first representation, a second set of media content segments at a second representation, and so on. The UE can receive the MPD file and then parse the MPD file to view the available media contents (and corresponding bitrates) in the MPD file.

The UE can select a streaming interval (e.g., in minutes or seconds). The streaming interval can be a predetermined value. Alternatively, the streaming interval can be a dynamic value based on network conditions and/or based on battery status information for the UE. The streaming interval can indicate how often the UE is to update (or determine to not update) a current representation of media content segments that are being received at the UE. The UE can determine the streaming interval using the power-related contextual information, such as a remaining battery level at the UE. As a non-limiting example, if the streaming interval is 30 seconds, then the UE can determine whether or not to switch to another representation every 30 seconds. Thus, after 30 seconds, the UE can select either a representation with a higher quality level (e.g., a higher bit rate), a representation with a lower quality level (e.g., a lower bit rate), or continue receiving the streaming media content at the current representation.

The UE, via a power modeling module within the UE, can model a current power consumption while the streaming media content is being received at the UE. The UE can calculate the amount of power to be consumed at the UE for receiving each representation of media content described in the MPD file. The UE can calculate the remaining amount of power in terms of the energy consumed per second for each video bitrate. The UE can calculate the power consumption levels using battery status information for the UE, such as a remaining level (e.g., 10% of the battery is left). The UE can calculate the power consumption levels using device context information, such as a model type associated with the UE and/or a display resolution of the UE. In addition, the UE can calculate the power consumption levels using media content details (e.g., segment quality information, available bitrates), as described in the MPD file.

As a non-limiting example, the UE can calculate power consumption levels for three separate representations of streaming media content. A first representation can be of low quality, the second representation can of medium quality, and the third representation can be of high quality. The UE can determine that 10 minutes of the streaming media content at the first representation can be received at the UE before a battery dies at the UE. The UE can determine that 30 minutes of the streaming media content at the second representation can be received at the UE before the battery dies at the UE. The UE can determine that 60 minutes of the streaming media content at the third representation can be received at the UE before the battery dies at the UE. The UE can calculate the power consumption levels for the three separate representations of streaming media content using a remaining battery level at the UE (e.g., 20% of the battery is left), a model type associated with the UE, and a display resolution or screen size of the UE.

The UE, via the power modeling module in the UE, can recommend a bit rate for streaming the media content (i.e., recommend at which representation to receive the streaming media content) using the power consumption levels, wherein the power consumption levels were previously calculated for each representation of the streaming media content using the battery status information and the bitrate associated with each representation of streaming media content. In addition, the UE can select the recommended bitrate for the streaming media content using the device context information, user-defined power preference information, and a remaining amount of time for the streaming media content (e.g., the movie that is currently being received has 5 more minutes until the movie is finished). The power preference information can indicate the user's UE power preference, such as a preference to receive streaming media content of a highest quality level (or bitrate), regardless of the remaining battery level at the UE. The power preference information can indicate that the user prefers a high quality level when the remaining battery level at the UE is high, but a low quality level when the remaining battery level at the UE is low in order to conserve energy at the UE. The power preference information can indicate that the user prefers to receive streaming media content at relatively low quality levels in order to maximize the period of streaming media content to be received at the UE per battery charge. The power preference information can indicate that the user prefers certain types of media content at a higher bitrate as compared to other types of media content. For example, the user can prefer watching sports at a relatively high quality level, but can watch comedy movies at a relatively low quality level.

Based on the power consumption level associated with each representation of streaming media content, the device context information, the user-defined power preferences, the remaining amount of time in the streaming media content, etc., the power modeling module in the UE can recommend at which bitrate to receive the streaming media content. The UE can use a combination of the factors described above. In addition, certain factors can be weighted more heavily as compared to other factors. For example, receiving media content at a highest possible bitrate can outweigh conserving battery power at the UE.

As a non-limiting example, the UE can select a relatively low bitrate when the UE has 5% battery life left and 20 more minutes until the streaming media content has finished. In particular, the UE can calculate at which bitrate to stream the media content, such that the media content finishes being streamed before the battery dies at the UE. In contrast, the UE can select a relatively high bitrate when the UE's battery is full.

In another example, the UE has 80% of battery life left and begins receiving a 2-hour video. The UE can select a highest possible bitrate, such that the entire 2-hour video can be received at the UE without the battery dying. In this example, the UE can compare various representations of the 2-hour video (e.g., to determine whether the 2-hour video can be completely received at the corresponding representation with respect to the remaining battery level) and select the representation that allows for the entire 2-hour video to be received at the highest possible bitrate.

As another non-limiting example, the UE can select a relatively low bitrate when a screen size of the UE is relatively small. In other words, selecting a higher bitrate can be futile on a smaller screen size, so in order to conserve battery power without a substantial perceived quality loss for a user, the UE can select the representation of the streaming media content at the relatively low bitrate. In other examples, the UE can select bitrates that correspond with the user's power preferences. In yet another example, the UE can select a bitrate based on the user's media content streaming plan. For example, the UE can select a higher bitrate when the user's media content streaming plan allows for a relatively large amount of data to be received at the UE over a network. In another example, the UE can select a relatively high bitrate when the battery level is full (e.g., at 100%), but periodically select lower bitrates as the streaming media content is being received and the battery level decreases. In yet another example, the UE can select the bitrate for the streaming media content in accordance with a quality level threshold defined by the user. In other words, the UE can select a lower bitrate based on the remaining battery level, but a quality level associated with the streaming media content can comply with the quality level threshold.

In one example, the power modeling module in the UE can recommend a certain representation of the streaming media content, as well as recommend a burst size for receiving the streaming media content with respect to efficient power utilization. The burst size can refer to a group of media content segments that can be simultaneously received at the UE. For example, the UE can receive 2 seconds of streaming media content in a single burst. As another example, the UE can receive 10 seconds of streaming media content in a single burst. In general, a larger burst of streaming media content can result in more efficient power utilization at the UE. In one example, the recommended burst size can be recommended based on available network conditions. Favorable network conditions can allow for the UE receiving larger bursts of streaming media content, as opposed to unfavorable network conditions.

The UE, via a rate adaptation module in the UE, can fetch the media content segments to be downloaded based on the recommended representation (or bitrate). In other words, the UE can fetch the media content segments based on the power-related contextual information, rather than choosing the highest possible bitrate that matches the channel throughput, as performed in past streaming solutions. In addition, the UE, via the rate adaptation module in the UE, can fetch the bursts of streaming media content based on the burst size recommended by the power modeling module in the UE. The media content segments can be fetched from a media content server and played at the UE. In accordance with the streaming interval (e.g., every 2 minutes), the power modeling module in the UE can recalculate a recommended representation and burst size, and the rate adaptation module in the UE can fetch the streaming media content in accordance with the recalculated recommended representation. In addition, the UE can monitor and estimate current download rates and report this information to other components (e.g., the power modeling module) in the UE. For example the power modeling module in the UE can select the recommended burst sizes based on the current download rates.

Figure 5:
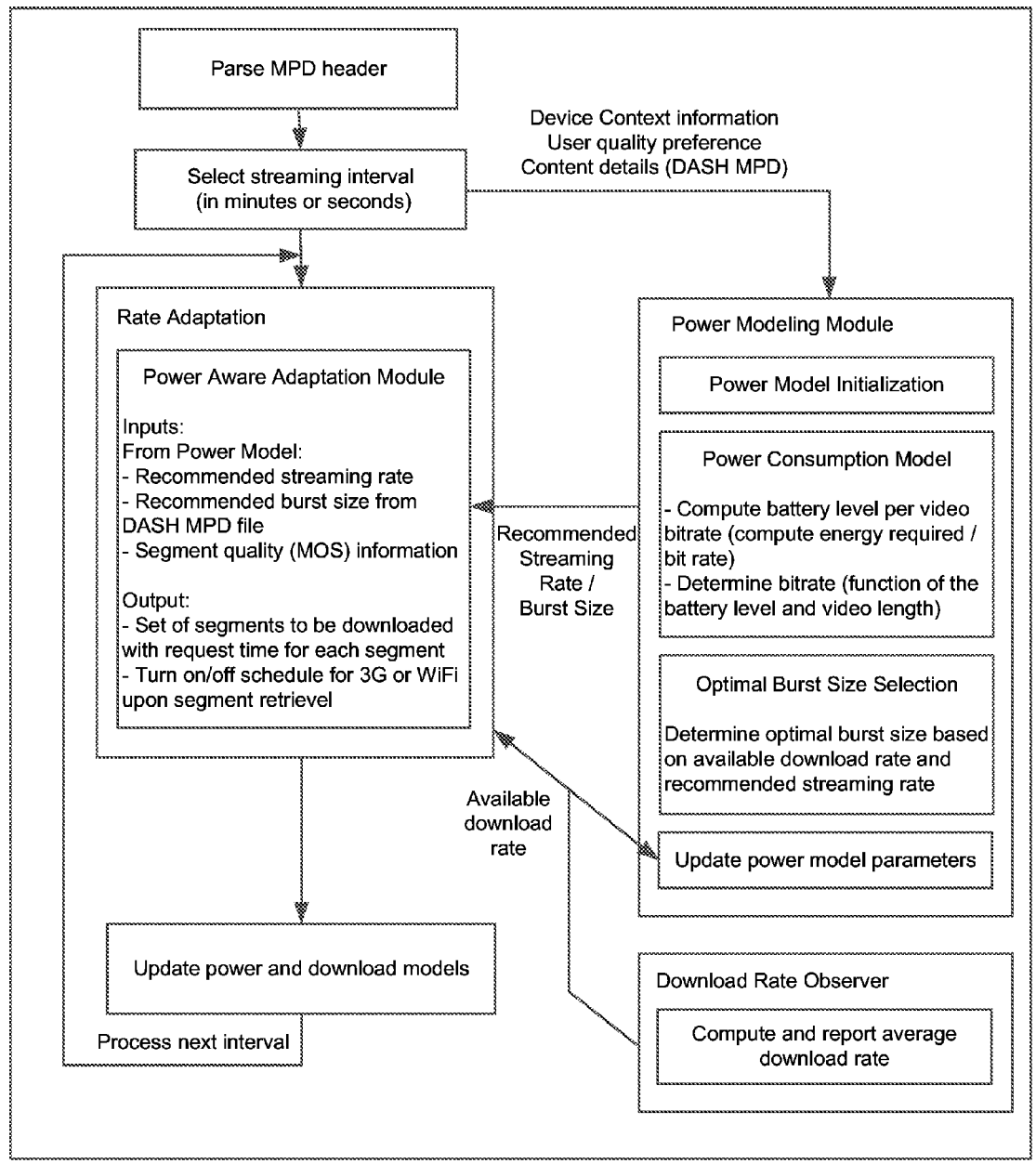
FIG. 5 is a flowchart that details selecting media content segments to be received at a user equipment (UE) based on power-related contextual information in accordance with an example.

FIG. 5 is an exemplary flowchart that illustrates selecting media content segments to be received at a user equipment (UE) based on power-related contextual information. The UE can receive a media presentation description (MPD) file. The MPD file can describe media content segments at a plurality of representations (or bitrates). The UE can receive the MPD file and then parse the MPD file to view the available media contents (and corresponding bitrates) in the MPD file. The UE can select a streaming interval (e.g., in minutes or seconds). The streaming interval can indicate how often the UE is to update (or determine to not update) a current representation of media content segments that are being received at the UE. The UE can determine the streaming interval using the power-related contextual information, such as a remaining battery level at the UE. As a non-limiting example, if the streaming interval is 30 seconds, then the UE can determine whether or not to switch to another representation every 30 seconds.

The UE, via a power modeling module within the UE, can model a current power consumption (or remaining battery life) while the streaming media content is being received at the UE. In one example, the relationship between power consumption and the media content streaming rate (i.e., the bitrate) can be represented by a logarithmic relationship: battery life=−a ln (b)+c, wherein a is a coefficient value between 0.5 and 0.6 (e.g., 0.5 for a full screen mode and 0.6 for a half screen mode), b is a video encoding bitrate (in Mbps), and c is a constant that varies with changes in the network bandwidth. In other words, the video encoding bitrate, the network bandwidth, screen size, etc. can affect the remaining amount of battery power in the UE. The values of a, b and c are device and network dependent, and can be initially determined based on device details (e.g., screen size, screen mode), network conditions, etc. After each streaming interval (e.g., power estimation iteration), the power consumption model can be updated with the actual power consumption for that streaming interval, which allows for fine tuning or adjustment of the a, b and c values.

As a non-limiting example, the UE can calculate the remaining battery life using the above equation if the UE is receiving streaming media content in a full screen mode and the bitrate of the streaming media content is relatively high. As another non-limiting example, the UE can calculate the remaining battery life using the above equation if the UE is receiving streaming media content in a half screen mode and the bitrate of the streaming media content is relatively low. For example, the UE can calculate 10 hours of remaining battery life if the streaming media content is received at a first representation, and 3 hours of remaining battery life if the streaming media content is received at a second representation.

In one example, the UE can, via a power modeling block at the UE, calculate the remaining battery life for various combinations of bitrates, full/half screen modes, network bandwidth changes, etc. In other words, the UE can compute the battery life per video bitrate (i.e., the energy for receiving the streaming media content at each bit rate). The UE can access information about the plurality of representations (or bitrates) for the streaming media content from the MPD file. In addition, the UE can receive device context information (e.g., the UE's screen size, the UE's model type), user power consumption preferences, battery status information (e.g., a percentage of remaining battery life), and a length of the streaming media content. Based on the above information, the UE can choose an appropriate representation (or bitrate) for receiving the streaming media content. The UE can choose an optimal streaming rate that guarantees streaming of the video until the end, as well as substantially similar streaming quality for the length of the video before the UE runs out of power. The UE can also choose the streaming rate using the user's preferences for video quality (in terms of a threshold for a video quality level). In addition, the UE can choose an optimal burst size (or segment size) at which the UE is to receive the media content segments. The UE can choose the burst size based on an available download rate. The UE can save additional power by turning on and off a radio interface in the UE between each burst of media content segments.

The recommended streaming bitrate and burst size can be provided to a rate adaptation block. In other words, the rate adaptation block can receive a recommended streaming rate, a recommended burst size, and segment quality information from the power modeling block in the UE. The rate adaptation block can fetch the media content segments at the recommended bitrate. In addition, the radio interface can be turned off after each burst of streaming media content is received and then turned back on before another burst of streaming media content is to be fetched from a media content server.

In one configuration, the UE can monitor and estimate current download rates and report this information to other components (e.g., the power modeling module) in the UE. For example the power modeling module in the UE can choose the recommended burst sizes based on the current download rates.

In one configuration, the size of an updated streaming interval can be determined based on the UE's power status information. The updated streaming interval can be used to reiterate the power consumption estimates and ensure that the power consumption estimates are accurate enough to achieve the goal of streaming the entire video or maintaining a steady quality throughout the streaming operation. The streaming interval can be initially set to 5 seconds, 10 seconds, 30 seconds, 1 minute, or 2 minutes, etc., and can dynamically vary thereafter. In other words, upon the completion of each streaming interval, the UE can recalculate the power consumption estimates and determine whether to switch to another bitrate. When battery conditions are good, a longer streaming interval can be selected. When battery conditions are poor, a shorter streaming interval can be recommended. After each streaming interval update, if there is a mismatch between the estimated power consumption and the actual power consumption (i.e., a mismatch that is above a defined threshold), then a shorter streaming interval can be preferred in order to provide improved adjustments to the power modeling parameters.

Figure 6:
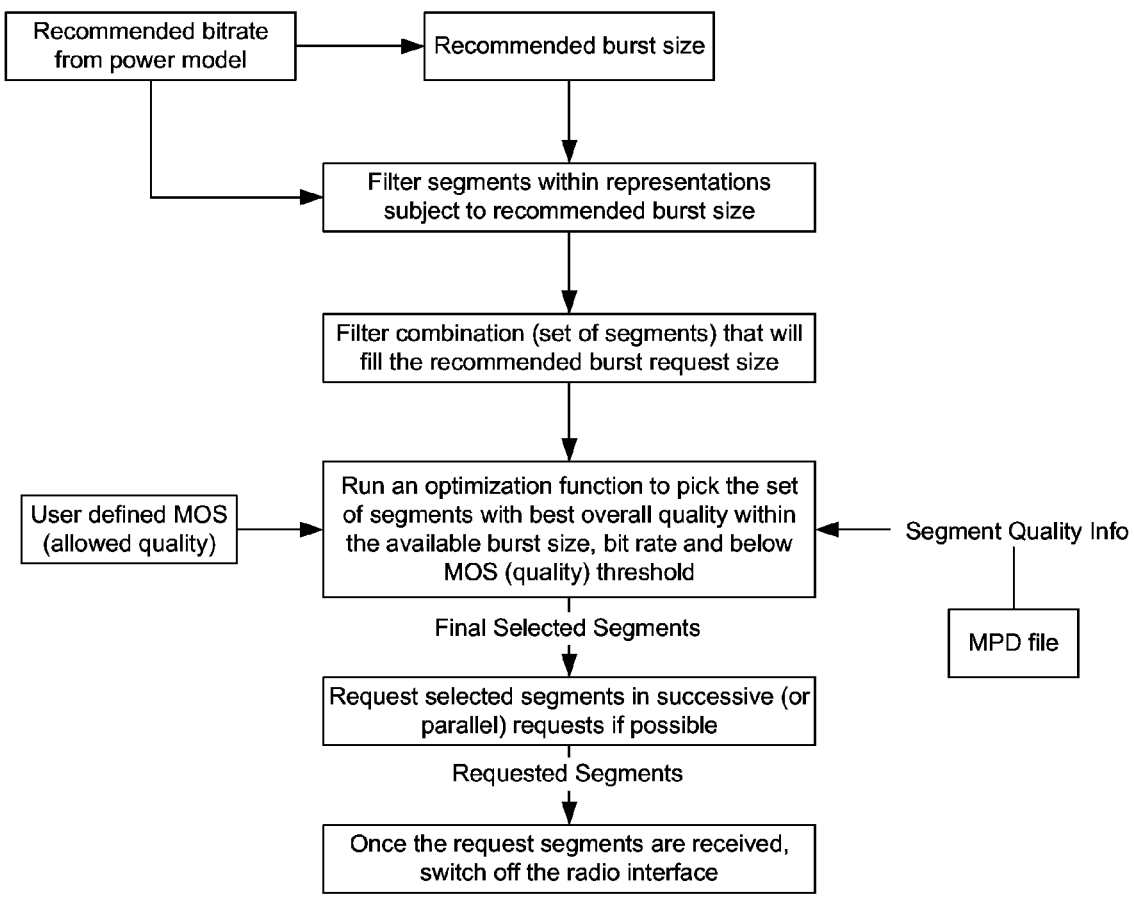
FIG. 6 is a flowchart that illustrates selecting media content segments to be received at a user equipment (UE) in accordance with a recommended burst size of the media content segments in accordance with an example.

FIG. 6 is an exemplary flowchart that illustrates selecting media content segments to be received at a user equipment (UE) in accordance with a recommended burst size of the media content segments. The UE, via a rate adaptation function, can use the recommended streaming rate, as well as segment quality information (from the MPD file), to optimally select the segments to be downloaded. Based on a burst size, segment requests are performed in burst and when all of the segments in the same burst request are downloaded at the UE, a radio interface at the UE can be switch offed to save power.

In one configuration, the UE can receive the recommended bitrate and the recommended burst size. The UE can filter segments within the representations subject to the recommended burst size. The UE can filter a set of segments that are to fill a recommended burst request size. The UE can run an optimization function to select the set of segments with a best overall quality within the available burst size, bit rate and below a defined quality level (which is defined by the UE's user). Information on the segment quality information can be used from the MPD file. The UE can request the selected segments in successive (or parallel) requests if possible. Once the requested segments are received at the UE, a radio interface at the UE can be temporarily switched off. At a later time, the radio interface at the UE can be switched back on.

Figure 7:
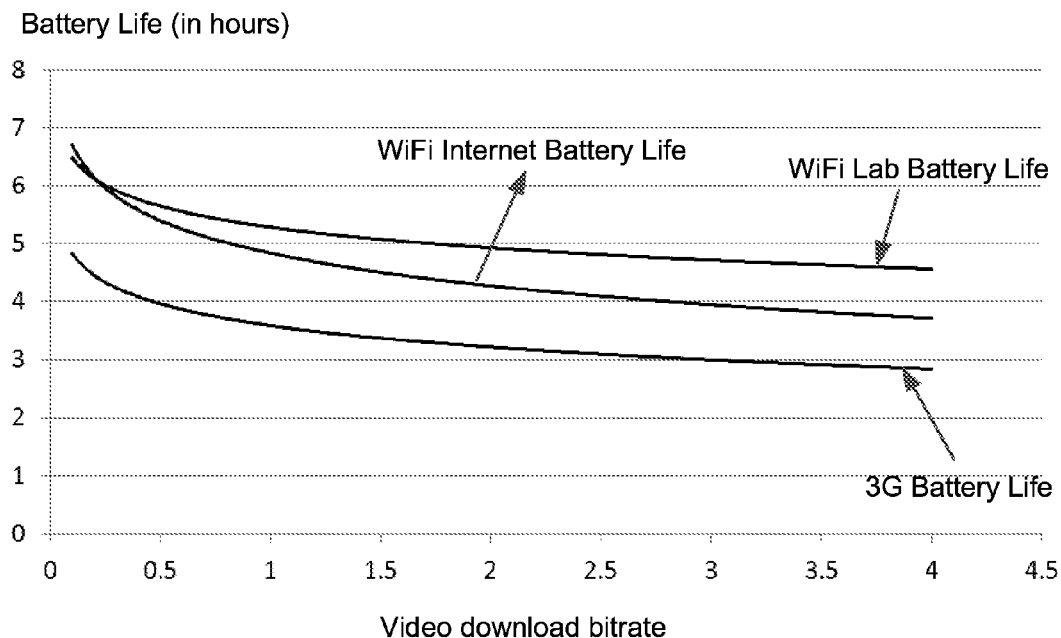
FIG. 7 is a graph illustrating the relationship between battery life and various media content download bitrates in accordance with an example.

FIG. 7 is an exemplary graph illustrating the relationship between battery life and various media content download bitrates. The various media content download bitrates can be associated with multiple network conditions. For example, the network conditions can include a third generation (3G) mobile telecommunications network, controlled WiFi access to a media content server, and uncontrolled WiFi access to the media content server through the Internet. As illustrated in FIG. 6, the battery life (in hours) for a user equipment (UE) can decrease as the media content download bit rate increases. This relationship is applicable when the UE is operating with a 3G network, or when the UE is accessing the media content server using controlled/uncontrolled WiFi access to the Internet. Thus, a lower media content download bitrate can provide an increased battery life, whereas a higher media content download bitrate can provide a decreased battery life.

Figure 8:
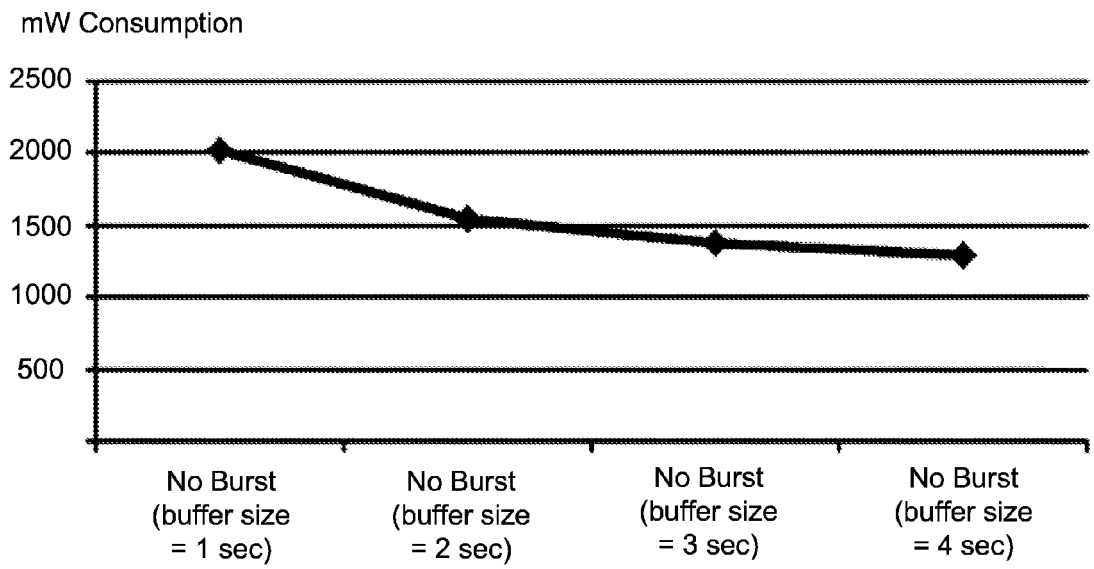
FIG. 8 is a graph illustrating the relationship between power consumption levels with respect to various media content burst sizes in accordance with an example.

FIG. 8 is an exemplary graph illustrating the relationship between power consumption levels with respect to various media content burst sizes. As illustrated in FIG. 7, a longer burst size generally leads to a relative decrease in power consumption at the user equipment (UE). The UE can receive a burst of media content, temporarily switch off a 3G transceiver or a WIFi transceiver in the UE for a time period that corresponds with a size of the burst, turn back on the 3G transceiver or the WiFi transceiver at the UE after the period of time has expired, and then receive another burst of media content. The UE generally saves additional power when the 3G/WiFi transceiver can be turned off for a longer period of time. In one example, a buffer size of 1 second (i.e., no burst) can consume approximately 2000 milliwatts (mW), a buffer size of 2 seconds can consume approximately 1500 mW, a buffer size of 3 seconds can consume approximately 1400 mW, and a buffer size of 4 seconds can consume approximately 1300 mW. In other words, the power consumption can decrease as the burst size increases. In general, relatively large burst sizes (if within the network constraints) are preferable at the UE that is fetching the media content segments. The UE can estimate an efficient burst size based on current available download rates and the available media content segment sizes, as indicated in a media presentation description (MPD) file.

Figure 9:
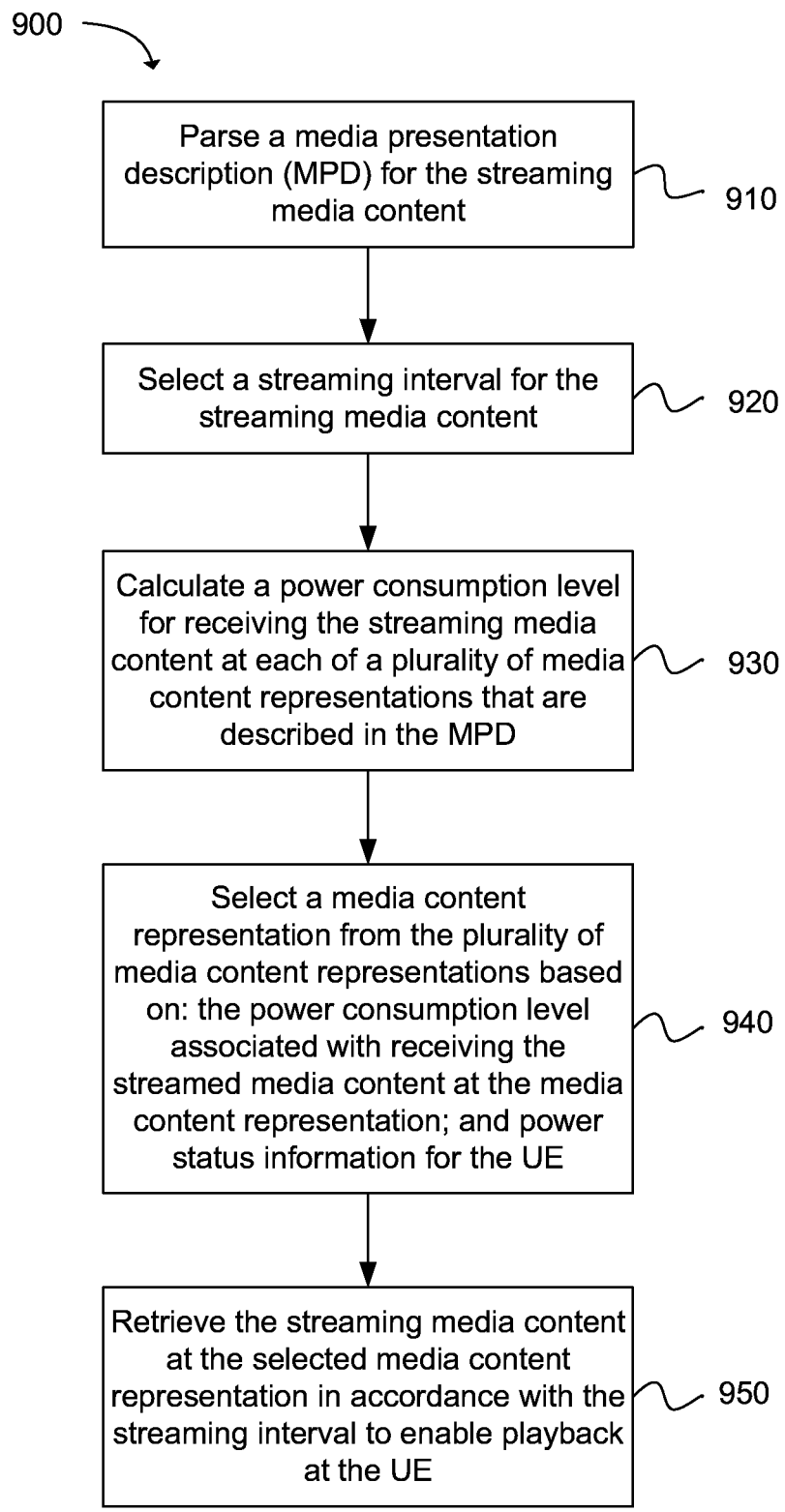
FIG. 9 depicts functionality of circuitry of a user equipment (UE) operable to receive streaming media content.

Another example provides functionality 900 of circuitry of a user equipment (UE) operable to receive streaming media content, as shown in the flow chart in FIG. 9. The functionality can be implemented as a method or the functionality can be executed as instructions on a machine, where the instructions are included on at least one computer readable medium or one non-transitory machine readable storage medium. The circuitry can be configured to parse a media presentation description (MPD) for the streaming media content, as in block 910. The circuitry can be configured to select a streaming interval for the streaming media content, as in block 920. The circuitry can be configured to calculate a power consumption level for receiving the streaming media content at each of a plurality of media content representations that are described in the MPD, as in block 930. The circuitry can be configured to select a media content representation from the plurality of media content representations based on: the power consumption level associated with receiving the streamed media content at the media content representation; and power status information for the UE, as in block 940. The circuitry can be configured to retrieve the streaming media content at the selected media content representation in accordance with the streaming interval to enable playback at the UE, as in block 950.

In one example, the circuitry can be further configured to: select a burst size for receiving the streaming media content based on an available download rate at the UE; and fetch bursts of streaming media content at the selected media content representation according to the selected burst size in order to optimize power consumption at the UE. In addition, the circuitry can be further configured to switch off a radio interface at the UE between bursts of streaming media content that are received at the UE.

In one example, the circuitry can be further configured to select an updated media content representation upon transitioning to a subsequent streaming interval, the updated media content representation being selected based on updated power status information for the UE. In another example, the circuitry can be further configured to: increase the streaming interval when the power status information indicates that a remaining battery level for the UE is relatively high; or decrease the streaming interval when the power status information indicates that the remaining battery level for the UE is relatively low.

In one example, the circuitry can be further configured to select the media content representation from the plurality of media content representations based on a remaining amount of time for the streaming media content. In another example, the power status information for the UE includes a remaining battery level for the UE. In yet another example, the circuitry can be further configured to calculate the power consumption level for receiving the streamed media content at each of the plurality of media content representations based on at least one of: a model type associated with the UE or a display resolution of the UE.

In one example, the circuitry can be further configured to: receive power consumption preferences from a user associated with the UE; and select the media content representation from the plurality of media content representations based, in part, on the power consumption preferences. In another example, the circuitry can be further configured to select media content representations having relatively low quality levels or bitrates when the power status information indicates that a remaining battery level for the UE is below a defined threshold. In yet another example, the circuitry can be further configured to select media content representations having relatively high quality levels or bitrates when the power status information indicates that a remaining battery level for the UE is above a defined threshold.

In one example, each media content representation that is described in the MPD is associated with a defined bitrate. In another example, the circuitry can be further configured to receive the streaming media content over dynamic adaptive streaming over hypertext transfer protocol (DASH). In yet another example, the circuitry can be further configured to identify the power status information for the UE based on battery level information received from an operating system (OS) driver at the UE. In addition, the circuitry can be further configured to: identify a remaining amount of time for the streaming media content; identify a remaining battery level for the UE; and select the media content representation at a media content representation that ensures that the remaining amount of time for the streaming media content is received at the UE within the remaining battery level for the UE.

Figure 10:
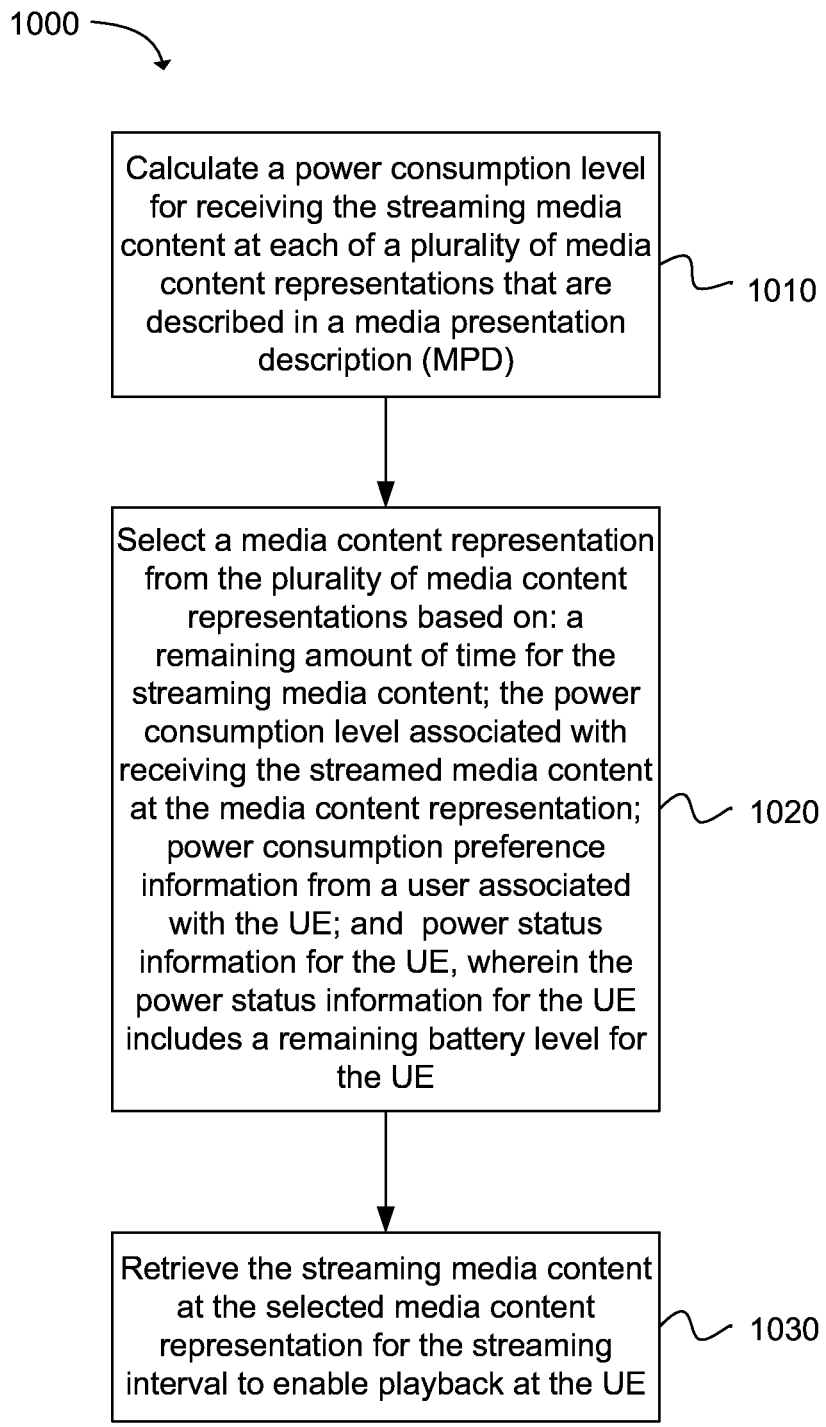
FIG. 10 depicts functionality of circuitry of a user equipment (UE) operable to receive media content streaming.

Another example provides functionality 1000 of circuitry of a user equipment (UE) operable to receive streaming media content, as shown in the flow chart in FIG. 10. The functionality can be implemented as a method or the functionality can be executed as instructions on a machine, where the instructions are included on at least one computer readable medium or one non-transitory machine readable storage medium. The circuitry can be configured to calculate a power consumption level for receiving the streaming media content at each of a plurality of media content representations that are described in a media presentation description (MPD), as in block 1010. The circuitry can be configured to select a media content representation from the plurality of media content representations based on: a remaining amount of time for the streaming media content; the power consumption level associated with receiving the streamed media content at the media content representation; power consumption preference information from a user associated with the UE; and power status information for the UE, wherein the power status information for the UE includes a remaining battery level for the UE, as in block 1020. The circuitry can be configured to retrieve the streaming media content at the selected media content representation for the streaming interval to enable playback at the UE, as in block 1030.

In one example, the circuitry can be further configured to select a burst size for receiving the streaming media content based on an available download rate at the UE; and fetch bursts of streaming media content at the selected media content representation according to the selected burst size in order to optimize power consumption at the UE. In another example, the circuitry can be further configured to switch off a radio interface at the UE between the bursts of streaming media content at the selected burst size. In yet another example, the circuitry can be further configured to select a streaming interval for the streaming media content; and retrieve the streaming media content at the selected media content representation in accordance with the streaming interval to enable playback at the UE. In addition, the circuitry can be further configured to select an updated media content representation upon transitioning to a subsequent streaming interval, the updated media content representation being selected based on updated power status information for the UE.

Figure 11:
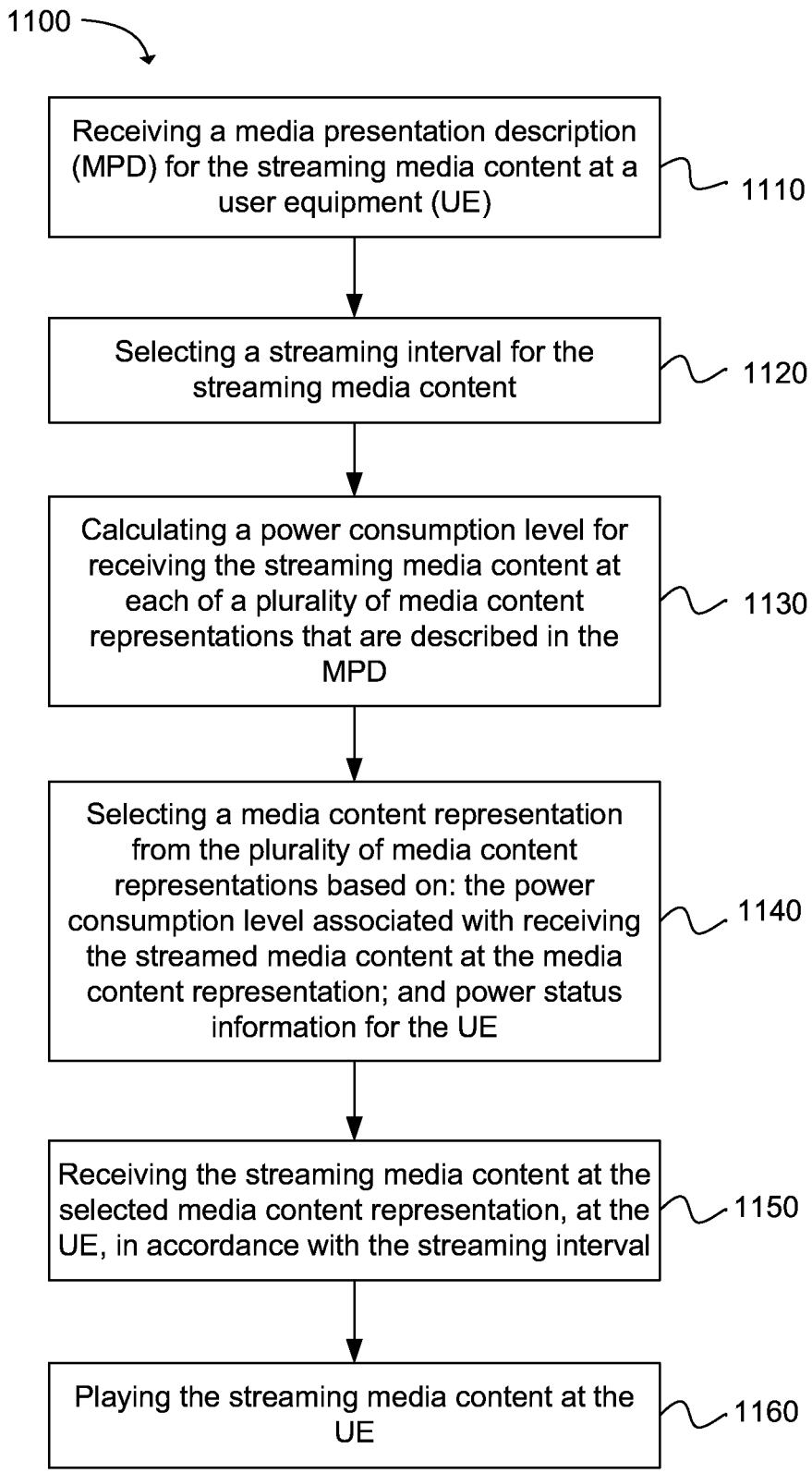
FIG. 11 depicts a flow chart of a method for receiving streaming media content in accordance with an example.

Another example provides a method 1100 for receiving streaming media content, as shown in the flow chart in FIG. 11. The method can be executed as instructions on a machine, where the instructions are included on at least one computer readable medium or one non-transitory machine readable storage medium. The method can include the operation of receiving a media presentation description (MPD) for the streaming media content at a user equipment (UE), as in block 1110. The method can include the operation of selecting a streaming interval for the streaming media content, as in block 1120. The method can include the operation of calculating a power consumption level for receiving the streaming media content at each of a plurality of media content representations that are described in the MPD, as in block 1130. The method can include the operation of selecting a media content representation from the plurality of media content representations based on: the power consumption level associated with receiving the streamed media content at the media content representation; and power status information for the UE, as in block 1140. The method can include the operation of receiving the streaming media content at the selected media content representation, at the UE, in accordance with the streaming interval, as in block 1150. The method can include the operation of playing the streaming media content at the UE, as in block 1160.

In one example, the method can include the operations of selecting a burst size for receiving the streaming media content based on an available download rate at the UE; and fetching bursts of streaming media content at the selected media content representation according to the selected burst size in order to optimize power consumption at the UE. In addition, the method can include the operation of switching off a radio interface at the UE between bursts of streaming media content that are received at the UE.

Figure 12:
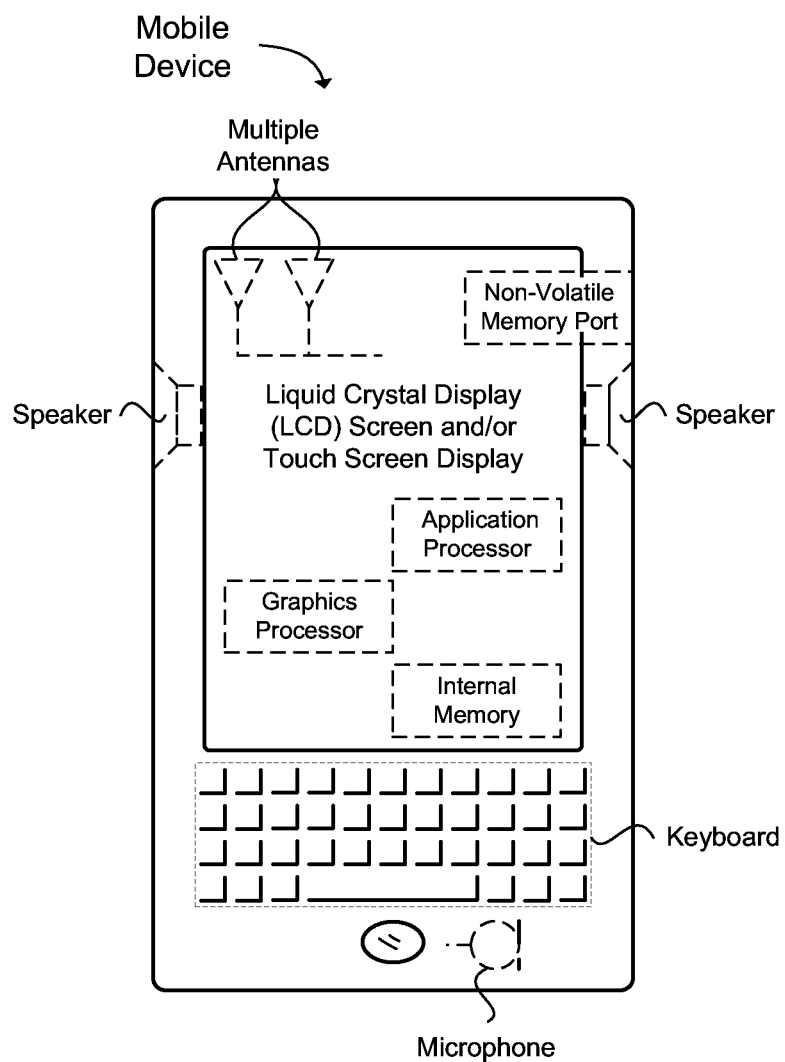
FIG. 12 illustrates a diagram of a wireless device (e.g., UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to receive streaming media content, the UE comprising one or more processors and memory configured to:
   parse a media presentation description (MPD) for the streaming media content;
   select a streaming interval for the streaming media content;
   calculate a power consumption level for receiving the streaming media content at each of a plurality of media content representations that are described in the MPD;
   select a media content representation from the plurality of media content representations based on:
      the power consumption level associated with receiving the streamed media content at the media content representation; and
      power status information for the UE
   retrieve the streaming media content at the selected media content representation in accordance with the streaming interval to enable playback at the UE; and
   determine updated power status information for the UE after each streaming interval to reflect actual power consumption at the UE, wherein the updated power status information for the UE is determined based on: a coefficient value that represents a type of screen mode for the UE, a video encoding bitrate and a value that represents a change in network bandwidth, and the updated power status information is utilized to select an updated media content representation.

2. The UE of claim 1, wherein the one or more processors and memory are further configured to:
   select a burst size for receiving the streaming media content based on an available download rate at the UE; and
   fetch bursts of streaming media content at the selected media content representation according to the selected burst size in order to optimize power consumption at the UE.

3. The UE of claim 1, wherein the one or more processors and memory are further configured to switch off a radio interface at the UE between bursts of streaming media content that are received at the UE.

4. The UE of claim 1, wherein the one or more processors and memory are further configured to select the updated media content representation upon transitioning to a subsequent streaming interval, the updated media content representation being selected based on the updated power status information for the UE.

5. The UE of claim 1, wherein the one or more processors and memory are further configured to:
   increase the streaming interval when the power status information indicates that a remaining battery level for the UE is relatively high; or
   decrease the streaming interval when the power status information indicates that the remaining battery level for the UE is relatively low.

6. The UE of claim 1, wherein the one or more processors and memory are further configured to select the media content representation from the plurality of media content representations based on a remaining amount of time for the streaming media content.

7. The UE of claim 1, wherein the power status information for the UE includes a remaining battery level for the UE.

8. The UE of claim 1, wherein the one or more processors and memory are further configured to calculate the power consumption level for receiving the streamed media content at each of the plurality of media content representations based on at least one of: a model type associated with the UE, a screen size of the UE or a display resolution of the UE.

9. The UE of claim 1, wherein the one or more processors and memory are further configured to:
receive power consumption preferences from a user associated with the UE; and
select the media content representation from the plurality of media content representations based, in part, on the power consumption preferences.

10. The UE of claim 1, wherein the one or more processors and memory are further configured to select media content representations having relatively low bitrates than can be associated with lower quality levels when the power status information indicates that a remaining battery level for the UE is below a defined threshold.

11. The UE of claim 1, wherein the one or more processors and memory are further configured to select media content representations having relatively high bitrates that are generally associated with higher quality levels when the power status information indicates that a remaining battery level for the UE is above a defined threshold.

12. The UE of claim 1, wherein each media content representation that is described in the MPD is associated with a defined bitrate and a defined quality level.

13. The UE of claim 1, wherein the one or more processors and memory are further configured to receive the streaming media content over dynamic adaptive streaming over hypertext transfer protocol (DASH).

14. The UE of claim 1, wherein the one or more processors and memory are further configured to identify the power status information for the UE based on battery level information received from an operating system (OS) driver at the UE.

15. The UE of claim 1, wherein the one or more processors and memory are further configured to:
identify a remaining amount of time for the streaming media content;
identify a remaining battery level for the UE; and
select the media content representation at a media content representation that ensures that the remaining amount of time for the streaming media content is received at the UE within the remaining battery level for the UE.

16. A user equipment (UE) operable to receive streaming media content, the UE comprising one or more processors and memory configured to:
calculate a power consumption level for receiving the streaming media content at each of a plurality of media content representations that are described in a media presentation description (MPD);
select a media content representation from the plurality of media content representations based on:
a remaining amount of playback time for the streaming media content;
the power consumption level associated with receiving the streamed media content at the media content representation;
power consumption preference information from a user associated with the UE; and
power status information for the UE, wherein the power status information for the UE includes a remaining battery level for the UE,
retrieve the streaming media content at the selected media content representation for a streaming interval to enable playback at the UE; and
determine updated power status information for the UE after each streaming interval to reflect actual power consumption at the UE, wherein the updated power status information for the UE is determined based on: a coefficient value that represents a type of screen mode for the UE, a video encoding bitrate and a value that represents a change in network bandwidth, and the updated power status information is utilized to select an updated media content representation.

17. The UE of claim 16, wherein the one or more processors and memory are further configured to:
select a burst size for receiving the streaming media content based on an available download rate at the UE; and
fetch bursts of streaming media content at the selected media content representation according to the selected burst size in order to optimize power consumption at the UE.

18. The UE of claim 17, wherein the one or more processors and memory are further configured to switch off a radio interface at the UE between the bursts of streaming media content at the selected burst size.

19. The UE of claim 16, wherein the one or more processors and memory are further configured to:
select the streaming interval for the streaming media content; and
retrieve the streaming media content at the selected media content representation in accordance with the streaming interval to enable playback at the UE.

20. The UE of claim 16, wherein the one or more processors and memory are further configured to select the updated media content representation upon transitioning to a subsequent streaming interval, the updated media content representation being selected based on the updated power status information for the UE.

21. A method for receiving streaming media content, comprising:
receiving a media presentation description (MPD) for the streaming media content at a user equipment (UE), using one or more processors of the UE;
selecting a streaming interval for the streaming media content, using the one or more processors of the UE;
calculating a power consumption level for receiving the streaming media content at each of a plurality of media content representations that are described in the MPD, using the one or more processors of the UE;
selecting a media content representation from the plurality of media content representations based on:
the power consumption level associated with receiving the streamed media content at the media content representation; and
power status information for the UE, using the one or more processors of the UE;
receiving the streaming media content at the selected media content representation, at the UE, in accordance with the streaming interval, using the one or more processors of the UE;
playing the streaming media content at the UE, using the one or more processors of the UE; and
determining updated power status information for the UE after each streaming interval to reflect actual power consumption at the UE, wherein the updated power status information for the UE is determined based on: a coefficient value that represents a type of screen mode for the UE, a video encoding bitrate and a value that represents a change in network bandwidth, and the updated power status information is utilized to select an updated media content representation, using the one or more processors of the UE.

22. The method of claim 21, further comprising:

selecting a burst size for receiving the streaming media content based on an available download rate at the UE; and fetching bursts of streaming media content at the selected media content representation according to the selected burst size in order to optimize power consumption at the UE.

23. The method of claim 21, further comprising switching off a radio interface at the UE between bursts of streaming media content that are received at the UE.

* * * * *